(12) United States Patent
Dunnahoo et al.

(10) Patent No.: US 7,783,497 B2
(45) Date of Patent: Aug. 24, 2010

(54) METHOD OF ADAPTIVE BROWSING FOR DIGITAL CONTENT

(75) Inventors: Sean Dunnahoo, Portland, OR (US); Christie Flynn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 908 days.

(21) Appl. No.: 11/392,276

(22) Filed: Mar. 28, 2006

(65) Prior Publication Data
US 2007/0239566 A1    Oct. 11, 2007

(51) Int. Cl.
G06F 17/30    (2006.01)
(52) U.S. Cl. ............................................. 705/1; 705/35
(58) Field of Classification Search ............... 705/1–80; 709/203–206; 725/39
See application file for complete search history.

(56) References Cited

U.S. PATENT DOCUMENTS

| 6,693,236 | B1 | 2/2004 | Gould et al. | |
| 2003/0018714 | A1* | 1/2003 | Mikhailov et al. | 709/203 |
| 2006/0174270 | A1* | 8/2006 | Westberg et al. | 725/39 |
| 2006/0259613 | A1* | 11/2006 | Othmer | 709/224 |

OTHER PUBLICATIONS

Bill Rosenblatt and Gail Dykstra, Integrating content Management with Digital Rights Management, May 14, 2003, GiantSteps media technology strategies, web edition, pp. 1-20.*

* cited by examiner

*Primary Examiner*—James P Trammell
*Assistant Examiner*—Marissa Liu
(74) *Attorney, Agent, or Firm*—D'Ann Naylor Rifai

(57) ABSTRACT

Providing adaptive visual browsing of digital content may be accomplished by presenting a scrolling ticker on a display for browsing of digital content available for viewing by a user of a processing system, the ticker having a plurality of items, each item including an image representing at least one of a content title and a content service provider; receiving a user input selection from a remote control device operated by the user, the user input selection selecting one of the ticker items to indicate the user's interest in the selected item; and changing at least one of the items in the ticker to another item in response to the user input selection, wherein the other item has metatags similar to or related to metatags of the selected item.

9 Claims, 7 Drawing Sheets

METHOD OF ADAPTIVE BROWSING FOR DIGITAL CONTENT

BACKGROUND

1. Field

The present invention relates generally to browsing for content and, more specifically, to adaptively changing images representing available digital content for browsing by a user based on the user's interests and actions.

2. Description

The introduction of Internet-based digital content (such as television (TV) programs, movies, sports, special events, music, games, and so on) into the living room usage model creates new challenges and opportunities for content providers and content consumers. In many cases, vast amounts of content will be made available to a user via a TV experience. In the TV experience (as opposed to the personal computer (PC) experience), the user is typically in "lean back" mode, where the user does not want (or cannot, due to input device limitations) interact with the display at the same intensity and mode as is possible when using a PC, or other electronic entertainment and/or computing device. PC users usually have the benefit of an input device such as a mouse for inputting navigation and control commands, for example, to the PC. This is not the case in the TV experience, since the user often must rely only on a TV remote control device for inputting commands and data to the entertainment system. In addition, the user typically views the display from a larger distance (e.g., 5-10 feet) in the TV experience, rather than the approximately one to two feet as when using a PC. As a result, in existing systems presenting the TV experience, there are difficulties in presenting large amounts of available content to the user in a functional, yet aesthetically pleasing way.

For the user to find content of interest requires new methods beyond conventional browsing or search tools. This is because the TV experience is inherently visual and, unlike standard broadcast TV content, much of the newly available content is not readily identifiable by a textual name and is not presented via familiar mechanisms such as time-based broadcast schedules.

BRIEF DESCRIPTION OF THE DRAWINGS

The features and advantages of the present invention will become apparent from the following detailed description of the present invention in which.

DETAILED DESCRIPTION

An embodiment of the present invention is a method of presenting information about available content on a display to a user in a manner that adapts over time to the user's interests based on user selections. In at least one embodiment of the present invention, information about available content may be shown on a display as a scrolling set of images called a "ticker." Each discrete component of the ticker is called an item. An item represents available content for consumption by the user. Additionally, a set of buttons may be shown on the display to represent availability of content by specific categories of content. The display behavior of the ticker and the buttons in response to user actions may be based on attributes of the available content. Each content title may correspond to a content profile having a plurality of metatags, wherein each metatag specifies a content attribute. The profiles may be used by an application program executing on a processing system to identify content having similar or related attributes. As the user selects content of interest, the application program controlling the user interface adapts the displayed information over time to show information about other content available to the user that the user may be more likely to have an interest in (i.e., content and content service providers that are more relevant to the user's interests). More specifically, the ticker and buttons may be modified over time to show the availability of content that is directed to the user's interests. This allows for effective visual browsing of large quantities of available content by the user for the TV experience.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
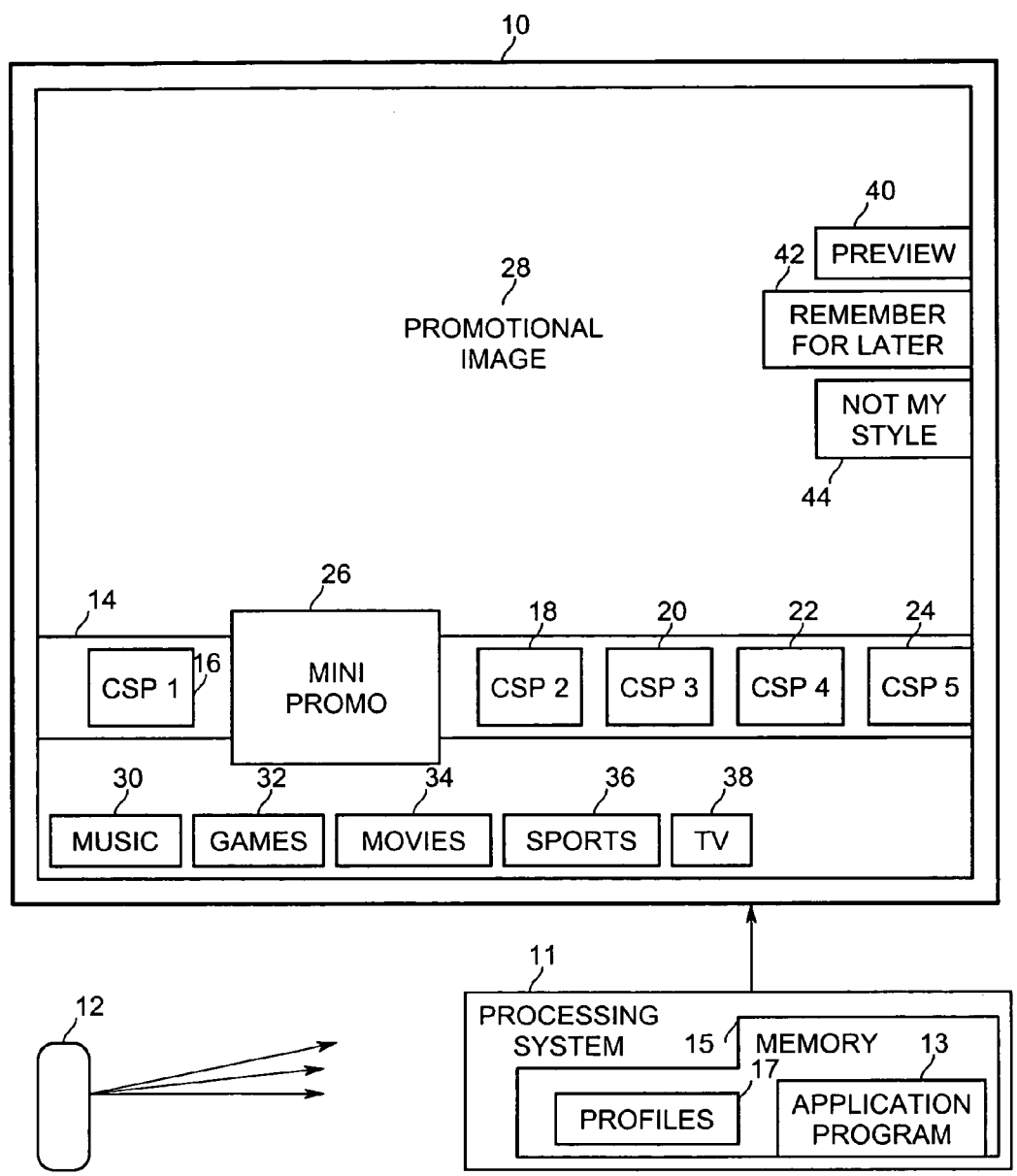
FIG. 1 is a diagram of a user interface, a display, and processing system according to an embodiment of the present invention.

FIG. 1 is a diagram of a user interface, a display 10, and a processing system 11 according to an embodiment of the present invention. In one embodiment, the display comprises a conventional TV or computer screen in any display technology now known or hereafter developed (e.g., cathode ray tube (CRT), rear projection, plasma, liquid crystal diode (LCD)), and so on, in either standard or high definition format. The display may be coupled by wire or wirelessly to processing system 11 having at least one memory 15. The processing system controls the presentation of images on the display for perception by the user according to conventional well known techniques. Application program 13 may execute on the processing system to provide the user interface by controlling the operation of the display, receiving and processing user commands, accessing content, and presenting content to the user. Remote control device 12 may be coupled to processing system 11 and operated by the user to select commands and data to be sent wirelessly to the processing system in conventional fashion. In one usage scenario, the processing system and display may be in a living room, den, kitchen, bedroom, or other room where the user is typically not within one or two feet of the display. In another usage scenario, the processing system is in a different room than the display and the user, and may function as a media server.

Embodiments of the present invention use application program 13 to control an animated ticker 14 shown on display 10 to present a series of items. Each item may comprise visual "thumbnail" images representing available digital content titles or content service providers (CSPs) to the user. The ticker 14 comprises a set of multiple items, each item having an image representing a content title and/or a CSP, or both. A content title comprises a specific program of available content such as a TV program, a sports event broadcast, a movie, a music video, a computer game, etc. A CSP comprises any content production and/or distribution entity, such as a cable TV provider (e.g., Comcast), satellite TV provider (e.g., DirectTV, Dish Network), a broadcast network (e.g., American Broadcasting Company (ABC), Music Television (MTV), or a content brand (e.g., The Walt Disney Company)) providing multiple content titles. The ticker items may represent content already local to the user's processing system, or subscription or on-demand content available for download or streaming operations to the user's processing system from a CSP. The example ticker shown in FIG. 1 shows five content service providers (CSPs) (CSP 1 16, CSP 2 18, CSP 3 20, CSP 4 22, and CSP 5 24) currently on the display at a certain point in time. As the ticker scrolls, other thumb nail images will be displayed and one or more of these CSP images may (temporarily) scroll off the display. At a later point in time, the images may "scroll around" and be displayed again in sequence on the display.

Many variations in the display of the ticker and other visual elements of the user interface shown on the display are contemplated. In one embodiment, the ticker scrolls to the left or to the right, continuously or periodically moving so as to show new images to the user over time. The speed or direction of the ticker may be manually controlled by user selection. In other embodiments, the ticker may have a border or no border, or may use a border that indicates a genre of available content (e.g., sports), a content source (e.g., movies from the Walt Disney Company), or a merchandising brand.

In one embodiment, an item having an associated thumbnail image representing a content title and/or a CSP may pass under a "virtual lens" at a predetermined position on the ticker portion of the display. This position is called a "mini-promo" image 26 herein. At this predetermined position, in one embodiment the content title image or CSP image from the ticker may be temporarily replaced by a different image while the scrolling content title image or CSP image is under the "virtual lens." This different image may indicate a promotional advertisement for a specific content title. This image may be represented in any manner that is different than the normal ticker images. For example, this image may be shown larger, clearer, or brighter than a normal ticker image, and/or may include a different border. In one embodiment, the static images of the normal ticker may be replaced with an animated sequence of images for the mini-promo image while under the "virtual lens." Thus, a promotional video clip for an item may be shown to the user while the item is under the virtual lens.

Other visual elements may be included on the display according to embodiments of the present invention. A promotional image 28 may be shown on a larger portion of the display to advertise specific available content. In another embodiment, the promotional image may be replaced by the display of the currently selected content title for viewing by the user. A plurality of buttons may be displayed to the user to indicate content categories and/or programming genres. In one embodiment, a plurality of buttons for music 30, games 32, movies 34, sports 36, and TV programs 38, for example, may be shown. These buttons may be statically shown on the display to allow the user to select (using the remote control device) specific types of content to further browse in more detail.

In embodiments of the present invention, the ticker items and the buttons are changed dynamically and adaptively in real-time based on which ticker item or button is selected by the user with the remote control device, as well as by past user input selections. This allows the application program executing on the processing system to identify the user's interests implicitly based on relevance, according to the ticker items and/or buttons selected. The application program may then start showing ticker items and buttons for content that is similar to or related to the user's interests in order to improve the user's browsing experience. Thus, items of more relevance to the user will be shown to the user over time.

Additional buttons may also be shown on the display to assist the visual browsing method of embodiments of the present invention to correlate the user's interests with available content. When the user selects a ticker item, in addition to changing the thumbnail images for items in the ticker and the buttons, the user may be presented with a still image or video that provides more information about the selected content. This allows the user to request to obtain the content, or to explicitly communicate to the application program that once they saw more information about the content, the user has no interest in that particular content.

In one example, a button 40 may be provided for causing the previewing of the content title currently being shown in the promotional image. When the user selects the preview button 40, promotional image 28 may be replaced with a portion of the content title associated with the promotional image and/or the content title currently under the "virtual lens." If the user chooses to preview this content title, this information may be recorded by the application program as something that the user is interested in (for example, in a profile 17 including characteristics of the user's interests). Additionally, a content profile for the content title may be accessed, and the content title's metatags included in the content profile may be noted for use in determining other content that the user might be interested in. When the user selects the button 42 marked "remember for later," the content title's profile may also be accessed, and the content title's metatags from the profile may be noted for use in determining other content that the user might be interested in. In contrast, when the user selects the button 44 marked "not my style," a negative association between the content title being promoted in the mini-promo and/or promotional image and the user may be recorded by the application program. Each content title and/or CSP may have at least one associated content profile. The profiles 17 may be stored in a memory 15 in the processing system accessible by the application program. The user interests collected by the application program based on the user's selections may be stored in a user interests profile in a memory of the processing system.

Metatags may denote many different attributes of the content. For example, metatags may denote one or more attributes such as name, full title, media type, format, release date, thumbnail image, full screen promotional image, preview video clip, running time, preview vs. abridged vs. full length versions, menu buttons (e.g., rent, watch now, preview, subscribe), license restrictions/expirations, content categories, branding elements, genres, sub-genres, advertisements, parental control categories, artists, performers, actors and actresses, directors, sports teams, sports divisions, conferences, and leagues, musical styles, dates, game types, game characters, movie characters, authors, band names, emotional characteristics and/or content keywords (e.g., funny, moody, serious, romantic, action, spy thriller, fast cars, for women, for men, for children, for teens, historical, sad, farce, etc.), or other distinguishing features.

An extensible metatag scheme may be used to support wide and flexible content profiles and user interest profiles. A broad set of metatags allows for "surfing" the content, where the user can discover new content while browsing instead of following a regimented, category-based browsing experience as known in the prior art (e.g., as in electronic program guides (EPGs)).

Figure 2:
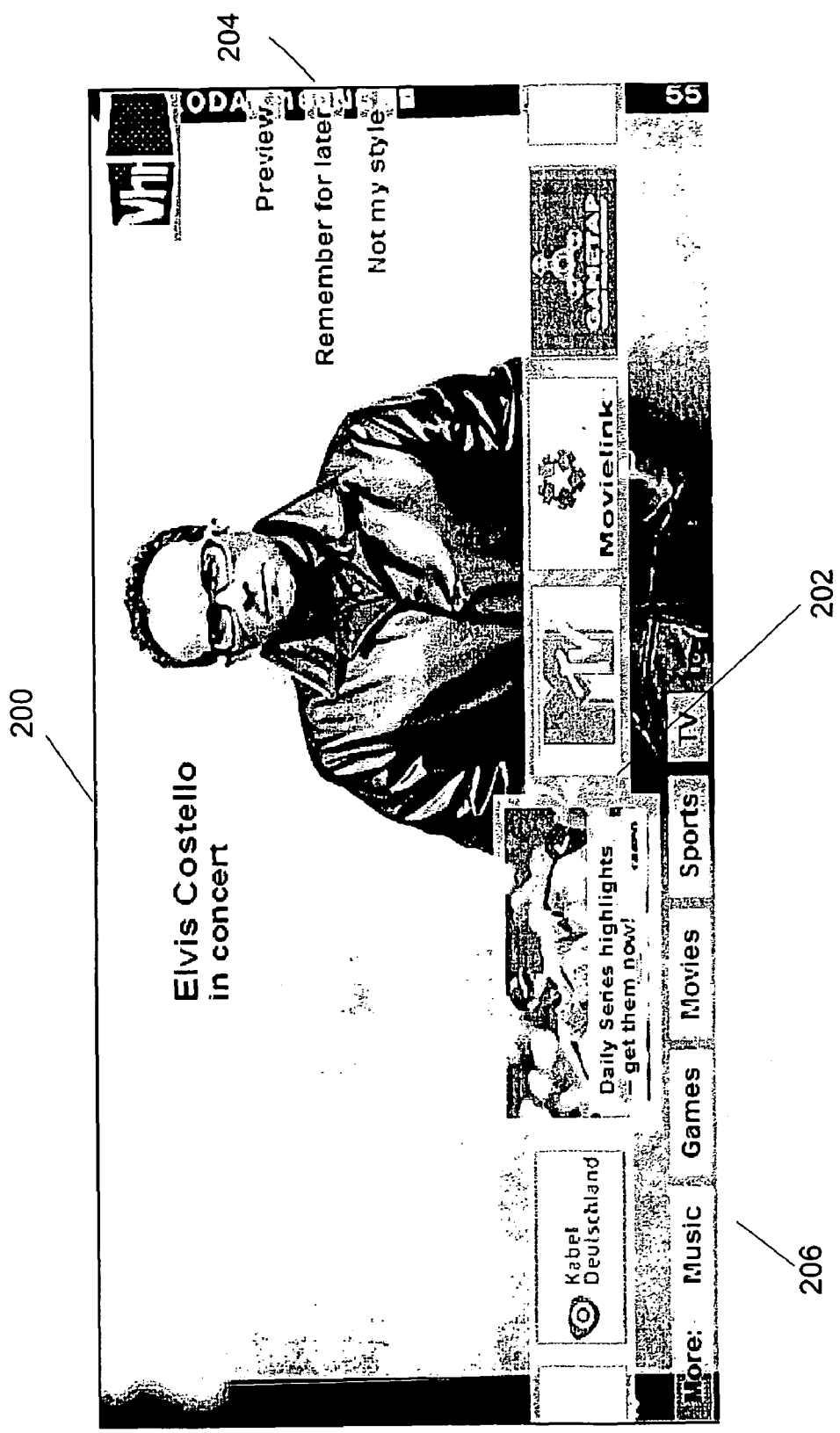
FIG. 2 is an example display illustrating a ticker in a user interface according to an embodiment of the present invention.

FIG. 2 is an example display illustrating a ticker according to an embodiment of the present invention. In this example, display 200 shows a promotional image of recording artist Elvis Costello. At the same time, the ticker 202 scrolls by showing the user many items having images corresponding to CSPs. A plurality of buttons 204 are shown to allow the user to select whether the user is interested in viewing the Elvis Costello concert preview, saving the content preview for later, or is not interested in the concert. Buttons 206 are shown to allow the user to select content categories. In this example, when the ESPN item passes under the "virtual lens," a mini-promo image or video for baseball World Series highlights is shown in the mini-promo portion of the ticker instead of the normal thumbnail image.

Figure 3:
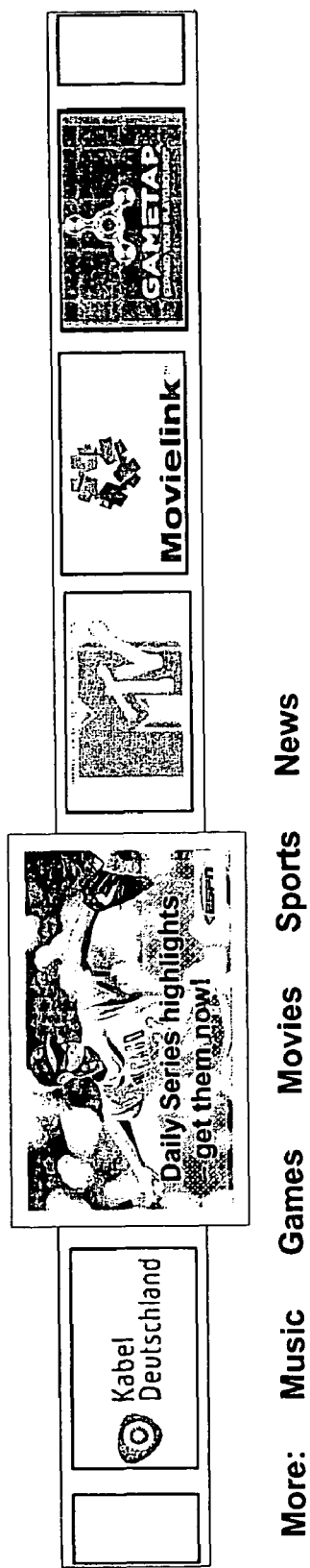
FIG. 3 is an example display illustrating a first level ticker in a user interface according to an embodiment of the present invention.
Figure 4:
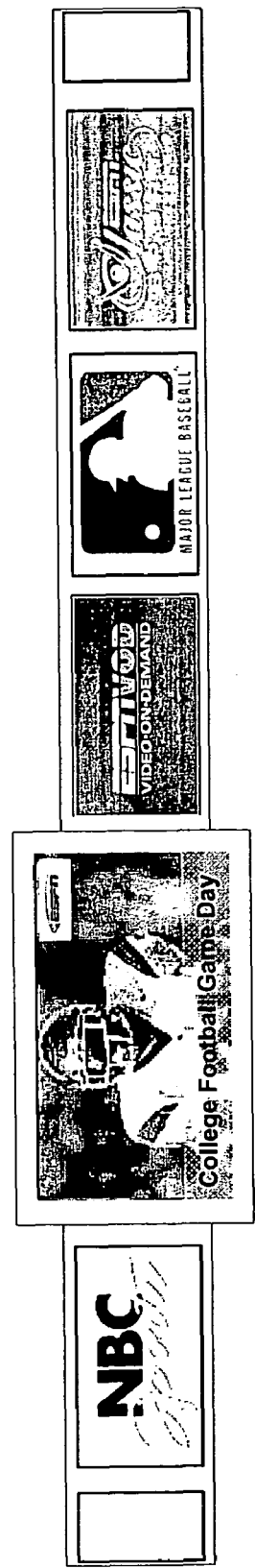
FIG. 4 is an example display illustrating a second level ticker in a user interface according to an embodiment of the present invention.

How user actions influence the ticker and button behavior is shown in FIGS. 3 and 4. In this example, when the user selects a sports-related item in the ticker or a sports-related button, the application program assumes that user is interested in some or all of the following: baseball, the World Series, sports, or ESPN. Since the application program may not know which of these is most important to the user, the content title and or content service provider images shown in the ticker may be modified over a period of time to include all of these content topics, and the user is allowed to pursue the desired interest path while visual browsing using the remote control. The user then has the opportunity to see items likely to be of interest, but is also exposed to tangentially related items that the user can "discover" even though the user hasn't directly pursued looking for them.

FIG. 3 is an example display illustrating a first level ticker according to an embodiment of the present invention. FIG. 3 shows the ticker snapshot from the example display of FIG. 2. In this example, the ticker includes items representing Kabel Deutschland, ESPN (providing the mini-promo in the "virtual lens"), MTV, Movielink, and Gametap. This illustrates that the application program may first show a high level ticker having diverse content titles and CSPs. FIG. 4 is an example display illustrating a second level ticker according to an embodiment of the present invention. Once the user selects a ticker item or button for the first level, the buttons may change to display the same or similar content titles, CSPs, or content categories, and the ticker may be changed to begin to introduce content titles and/or CSPs with metatags that are similar to the user's selection. The buttons provide a way for the user to explicitly specify a related path, more directly influencing the ticker content. In this example, the ticker is adaptively and dynamically changed to show sports CSPs (e.g., NBC Sports, EPSN video on demand, Major League Baseball, etc.) because the user selected a sports-related item as a result of FIG. 3.

In one embodiment, the change in ticker items is not made all at once. Instead, the ticker items are gradually changed as the ticker scrolls by to include more user-relevant (e.g., sports) items. The rate of change of the ticker items may be changed depending on the design considerations of the processing system. In embodiments of the present invention, there may be many levels of tickers, from the more general to the more specific, or geared towards user ages or other demographics. The number of items shown in the scrolling ticker may also be different on different levels.

Figure 5:
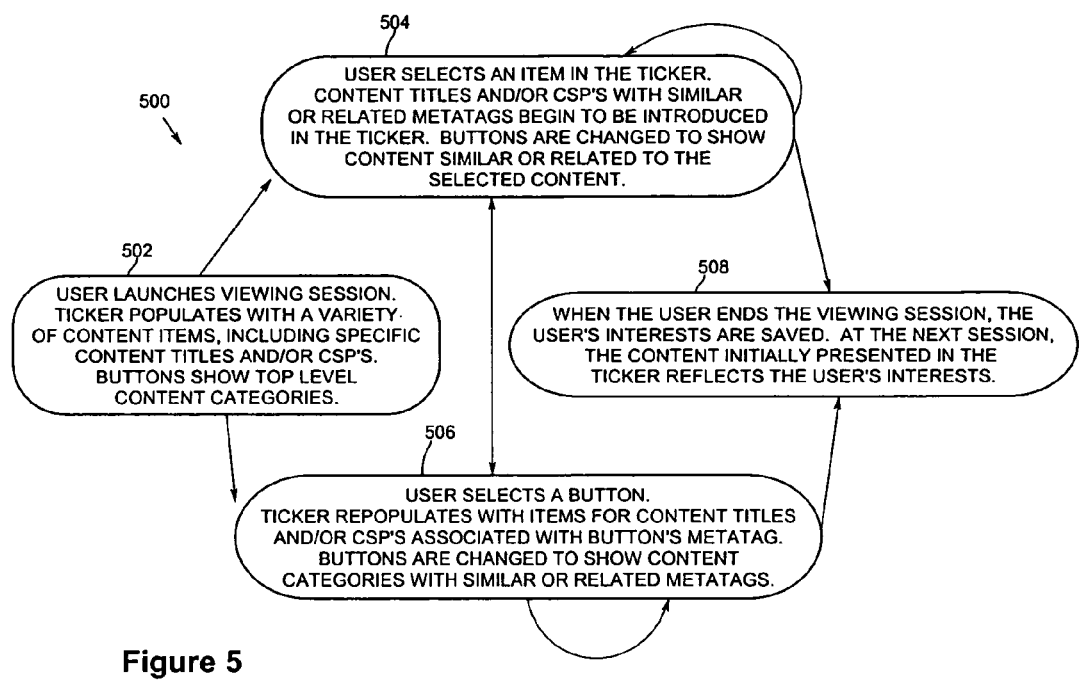
FIG. 5 is a state diagram of user interactions with the ticker and/or buttons of the user interface according to an embodiment of the present invention.

FIG. 5 is a state diagram 500 of user interactions with the ticker and/or buttons according to an embodiment of the present invention. At block 502, when the user launches an initial viewing session using the processing system and display, the ticker may be populated with a variety of items representing content, including specific content titles and/or CSPs. The buttons initially show top level content categories. If this is not an initial viewing session for this user, the application program obtains the user's interests profile in order to customize the ticker's items for this user. The user interests profile includes information about this user's past viewing and browsing interests. When the user selects an item in the ticker at block 504, content titles and/or CSPs with similar or related metatags begin to be introduced into the ticker as the ticker scrolls across the display. The buttons may also be changed to show content similar to or related to the content selected by the user. When the user selects a button at block 506, the ticker may be repopulated with items for content titles and/or CSPs associated with the button's metatags. The buttons may also be changed to show content categories with similar or related metatags. When the user ends the viewing session at block 508, the user's interests are saved in a user interest profile. At the launch of the next viewing session, the content items presented in the ticker reflect the user's interests based on the stored user interest profile. The user may need to identify himself or herself to the application program in order for the user-specific ticker to be presented. There may also be a default ticker for the processing system that is not specific to an individual user.

In one embodiment, the user may be allowed to reset the ticker and/or buttons to a wider variety of content titles, CSPs, or content categories.

Figure 6:
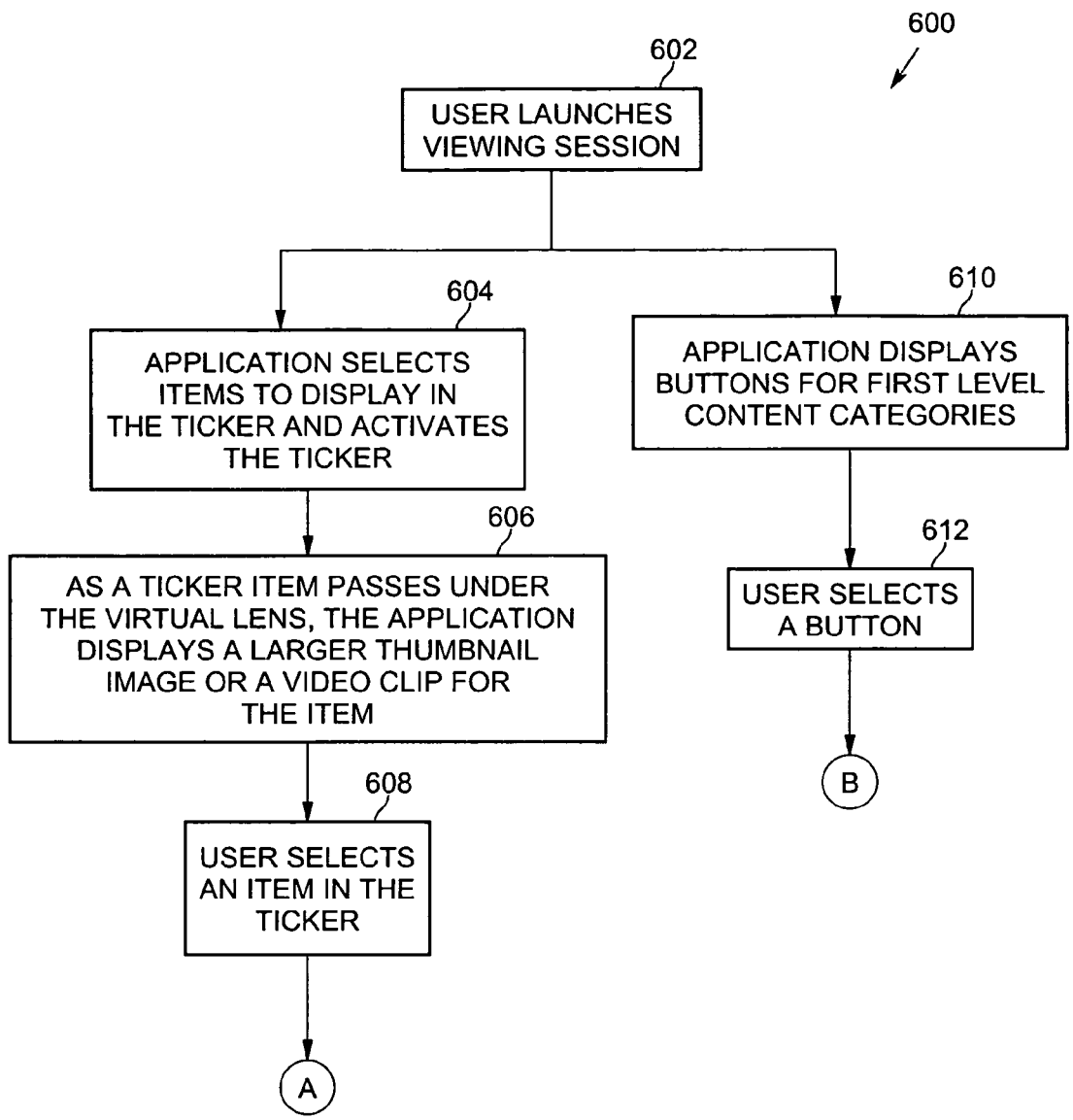
FIGS. 6-8 are flow diagrams illustrating user interface processing according to an embodiment of the present invention.
Figure 7:
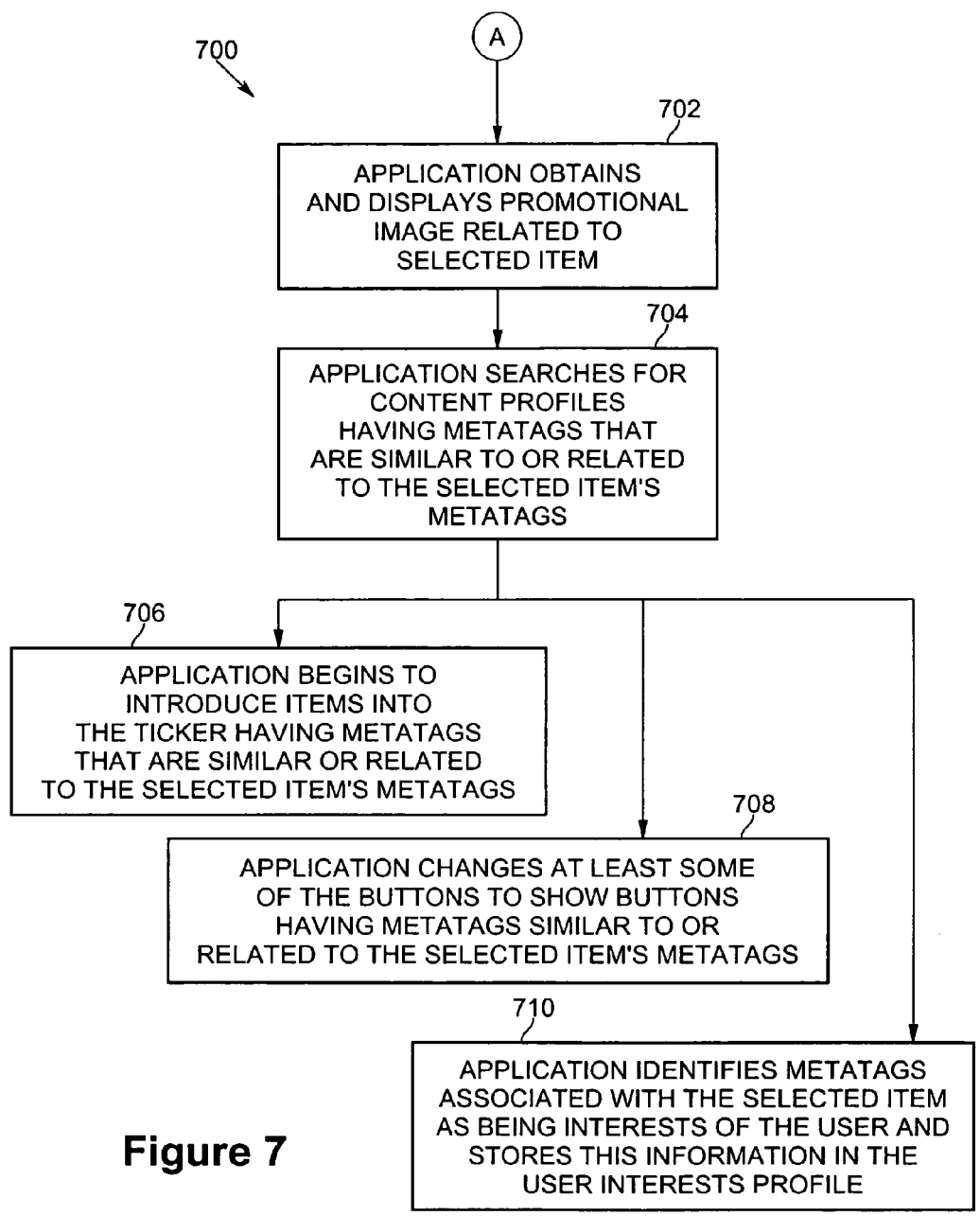
Figure 8:
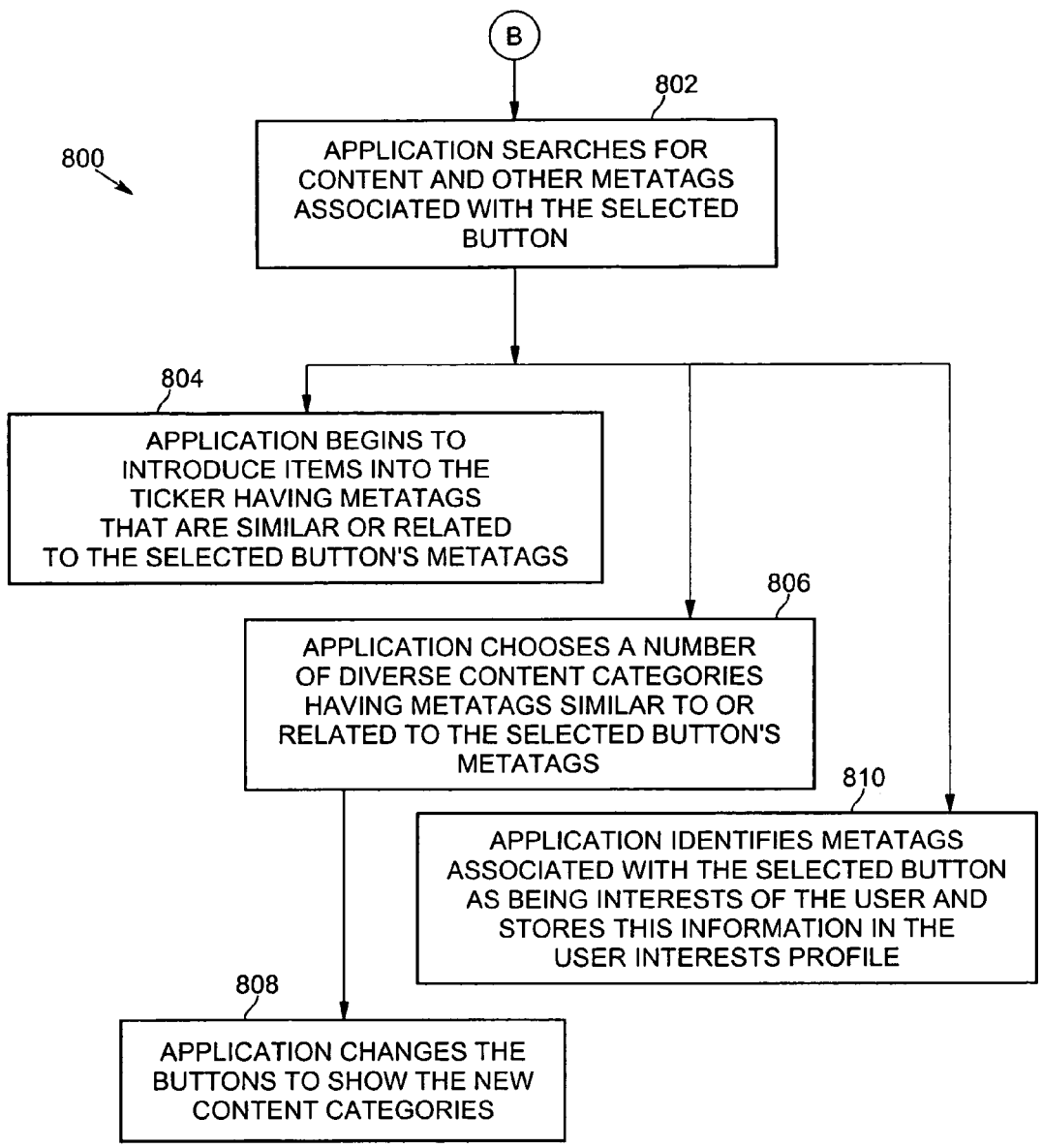

FIGS. 6-8 are flow diagrams illustrating user interface processing according to an embodiment of the present invention. In flow processing 600, the user may launch a viewing session at block 602 by sending one or more commands to the application program of the processing system. The application program executes and performs at least two actions initially. First, at block 604, the application program selects items to display in the ticker and activates the ticker. If this is the initial viewing session for this user, a general set of diverse items may be put into the ticker. If this is not an initial viewing session for this user, the application program obtains the user interest profile for this user, and uses information in the profile to populate the ticker with items of interest to the user based on the user's past browsing activity. Second, at block 610, the application program displays buttons for first level content categories. In one embodiment, the first level content categories may be general and diverse. In another embodiment, the first level content categories may be more specific based on the user interest profile. At block 606, as a ticker item passes under the virtual lens, the application program temporarily displays a larger thumbnail image or a video clip for the item, depending on the specific implementation or specific item. At any time while the ticker is shown on the display (either scrolling or stationary), the user may select an item in the ticker using the remote control device at block 608, or the user may select a button using the remote control device at block 612. When a ticker item is selected, processing continues at point A on FIG. 7. When a button is selected, processing continues at point B on FIG. 8.

When a ticker item is selected, flow processing 700 may be performed starting at point A. At block 702, the application program obtains and displays a promotional image related to the ticker item. In one embodiment, the promotional image may be shown in the promotional image 28 section of the display 10. At block 704, the application program searches for content profiles having metatags that are similar to or related to the selected ticker item's metatags. Content profiles may be for specific content titles, or may be for CSPs known to provide content related to the ticker item. At block 706, the application program begins to introduce items into the ticker having metatags that are similar to or related to the selected item's metatags. At block 708, the application program changes at least some of the buttons to show buttons having metatags similar to or related to the selected item's metatags. At block 710, the application program identifies metatags associated with the selected item as being interests of the user and stores this information in the user interests profile for this user so that later presentations of ticker items will include items of more relevance to the user.

When a button is selected, flow processing 800 may be performed starting at point B. At block 802, the application program searches for content and other metatags associated with the selected button. At block 804, the application program begins to introduce items into the ticker having metatags similar to or related to the selected button's metatags. At block 806, the application program chooses a number of diverse content categories having metatags similar to or related to the selected button's metatags. The number may be any integer. At block 808, the application program then changes the buttons to show the new content categories identified as a result of processing at block 806. At block 810, the application program identifies metatags associated with the selected button as being interests of the user and stores this information in the user interest profile for this user so that later presentations of ticker items will include items of more relevance to the user.

Embodiments of the present invention help users to see content of interest during browsing, without requiring the user to explicitly choose content preferences or complete a user profile. Content service providers may use embodiments of the invention to make users aware of new content and brands, and may target content more effectively and profitably to users. Embodiments of the present invention also make it easier for users to browse for more relevant content that interests them, to explore new interests in a fun way, and to enjoy that content in a way that is simple and matches the "lean back" paradigm already pervasive among users consuming content in their living rooms.

Although operations described herein may be described as a sequential process, some of the operations may in fact be performed in parallel or concurrently. In addition, in some embodiments the order of the operations may be rearranged.

The techniques described herein are not limited to any particular hardware or software configuration in processing system 11; they may be implemented in any computing or processing environment. The techniques may be implemented in hardware, software, or a combination of the two. The techniques may be implemented in programs executing on programmable machines such as mobile or stationary computers, personal digital assistants, Internet tablets, set top boxes, consumer electronics devices (such as televisions, digital video disk players, cable receivers, satellite receivers, and so on), and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multi-core processing systems, multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

What is claimed is:

1. A method for providing real-time adaptive visual browsing of digital content comprising:

presenting a ticker on a display for browsing of a plurality of digital content, wherein the plurality of digital content are for viewing by a user of a processing system, the ticker having a plurality of items, each item including an image representing at least one of the plurality of digital content;

receiving a user input selection from a remote control device operated by the user, the user input selection initiating display of a selected one of the plurality of digital content to the user;

identifying at least one metatag for the selected one of the plurality of digital content, the metatag including a content attribute;

using the content attribute to identify a similar or related content attribute in a second metatag associated with a different digital content of the plurality of digital content for viewing; and in response to identifying the similar or related content attribute, changing at least one of the items in the ticker to a new item corresponding to the different digital content.

2. The method of claim 1, wherein each of the plurality of available digital content has at least one associated metatag.

3. The method of claim 2, further comprising building a user interests profile for the user based on the user input selections and metatags of the selected available digital content, and using the user interests profile to select other available digital content of potential interest to the user to present in the ticker over time.

4. The method of claim 3, further comprising using the user interests profile to adaptively populate the ticker with more relevant items of potential interest to the user in subsequent viewing sessions.

5. The method of claim 1, further comprising displaying each one of the ticker items in a manner different than the other ticker items when each ticker item scrolls over a position on the display.

6. The method of claim 5, wherein when one of the ticker items scrolls over the position on the display, displaying at least one of a video clip and a promotional image relating to the ticker item on a portion of the display.

7. The method of claim 1, wherein each digital content of the plurality of available digital content is at least one of stored in the processing system and available from a content service provider coupled to the processing system.

8. The method of claim 3, further comprising presenting a plurality of buttons on the display, the buttons representing content categories, and adaptively changing the content categories over time to content categories of more relevance to interests of the user based on the user interests profile.

9. The method of claim 8, further comprising using the user interests profile to populate the buttons with content categories of more relevance to interests of the user in subsequent viewing sessions.

* * * * *